United States Patent [19]

Hoshino

[11] Patent Number: 5,165,635
[45] Date of Patent: Nov. 24, 1992

[54] TILTABLE TRIPOD STAND

[75] Inventor: Yoshihiro Hoshino, Nagoya, Japan

[73] Assignee: Hoshino Gakki Co., Ltd., Japan

[21] Appl. No.: 333,617

[22] Filed: Apr. 4, 1989

[30] Foreign Application Priority Data

Aug. 29, 1988 [JP] Japan .......................... 63-113188[U]

[51] Int. Cl.⁵ .......................................... F16M 13/00
[52] U.S. Cl. .................................. 248/169; 248/171; 248/520
[58] Field of Search ............... 248/169, 170, 171, 168, 248/166, 188.5, 520, 528, 525, 464; 211/203

[56] References Cited

U.S. PATENT DOCUMENTS

| | | | |
|---|---|---|---|
| 726,455 | 4/1903 | Pepper | 248/171 X |
| 1,479,765 | 1/1924 | Whiting | 248/168 |
| 1,795,747 | 3/1931 | Viken | 248/171 X |
| 2,153,821 | 4/1931 | Walberg | 248/169 X |
| 2,282,285 | 5/1942 | Olson | 248/169 |
| 4,199,123 | 4/1980 | Weber et al. | 248/188.2 |

FOREIGN PATENT DOCUMENTS 320777 10/1929 United Kingdom ................ 248/171

Primary Examiner—Karen J. Chotkowski
Attorney, Agent, or Firm—Ostrolenk, Faber, Gerb & Soffen

[57] ABSTRACT

A tripod stand for supporting a musical instrument or other object, wherein a main post is provided with an upper slide member to which the upper ends of the three legs of the tripod are hingedly connected. A respective articulated arm connects each leg with the lower portion of the main post. Movement of the slide member up and down causes selective inward and outward movement of the legs. One of the articulated arms is longer than the others and is attached further up its associated leg than the other articulated arms. Consequently, the downward movement of the slide member causes that leg attached to the one arm to move outward further from the main post, making the bottom ends of the legs move from defining an equilateral triangle to defining an isosceles triangle and thereby tilting the main post. Greater stability can be achieved by increasing the angle between the two legs that are opposite the leg having the one longer articulated arm.

17 Claims, 3 Drawing Sheets

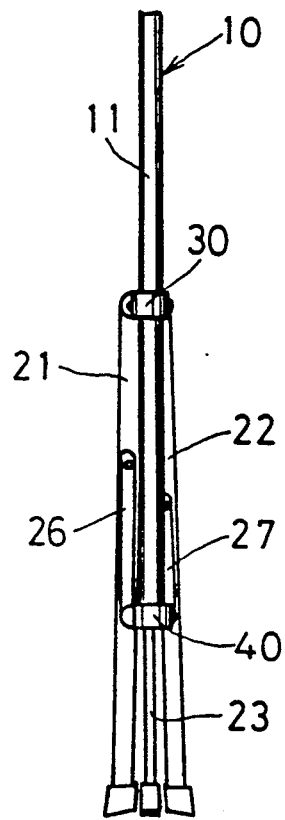
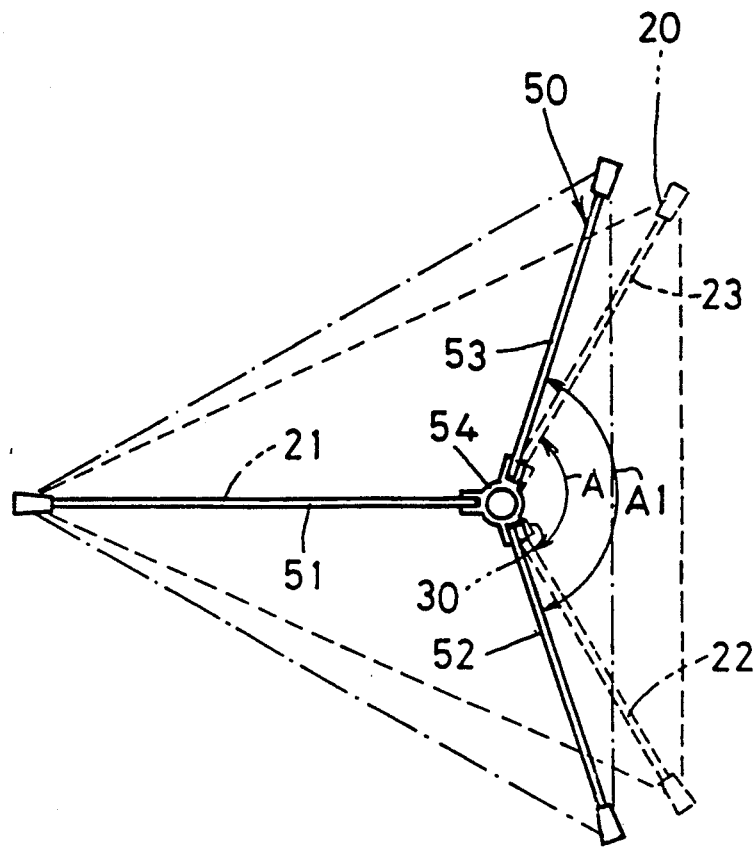

TILTABLE TRIPOD STAND

BACKGROUND OF THE INVENTION

The present invention relates to a tripod stand, particularly suited for musical instruments, wherein the stand has a main post and a tripod leg structure supporting the main post.

The tripod structure is collapsible, wherein the legs of the stand may be folded inward toward the main post and may be extended, folded or tilted outward, to form a tripod or three leg support structure.

Conventional tripod stands, e.g. for supporting musical instruments or other devices, include a main post and three legs supporting the post. A sliding structure is provided at the main post to enable the three legs to be folded outward from the main post to a supporting position and inward toward the main post to a storage or carrying position. The sliding structure may comprise an upper holding member slidable along the main post. The upper end of each leg of the tripod stand is journaled or hingedly connected to the upper holding member In such cases, the outer end of a respective articulated arm is journaled or hingedly connected along each leg, generally approximately at the middle of the leg and usually at the same distance along each leg from the upper holding member. A typically stationary, non-slidable lower holding member is provided on the main post below the upper holding member. The other, inner end of each articulated arm is journaled or hingedly connected to the stationary lower holding member. The above described movement of the tripod legs from the outward supporting to the inward storage positions can be achieved by the upper holding member being slidable along the main post while the lower holding member is stationary. With these types of connection for the legs and the articulated members of the stand, the sliding of the slidable holding member, whether it is the upper or lower member, along the main post determines the angles, measured through the main post, at which the legs are separated from each other and from the main post. In addition, those tilts or spacings of the legs from the main post angles are identical, causing the bottom ends of the legs to define an equilateral triangle.

However, where it is desired to hold a musical instrument such as a specific drum or cymbal, or another device, such as a microphone, extending in one direction and thus off the center of the stand, e.g. in close proximity to a performer, variations in the structure of the tripod stand have been required. Additional supports have been required on the main post to provide outriggers or booms for carrying the off center instrument or device. This changes the center of gravity of the entire tripod stand making it unstable, and the stand may fall or lean into other devices.

In the invention, the tripod structure is arranged so that the main post can be tilted from an upright position to provide the type of support usually provided by an outrigger, to bring the supported particular musical instrument or device into alignment with other instruments or devices or into desired proximity to the user. For example, such tilting of the main post is known to be accomplished by a particular arrangement of or connection to one of the legs of the tripod, to permit one of the legs to be tilted outwardly from the main post to a different extent or angle than the other legs. In another invention by the applicant hereof, the angle of incline of one leg is adjusted with respect to that of the other legs by moving either the upper end of the one leg or the end of its articulated arm along the main post with respect to the corresponding part of the other legs.

SUMMARY OF THE PRESENT INVENTION

The primary object of the present invention is the provision of a tripod stand having the function of desirably tilting the main post.

Another object of the invention is to tilt the stand by tilting one leg with respect to the other two legs.

A further object of the invention is to provide a stand capable of a multiplicity of functions in a very simple structure, wherein the stand is economical and very durable.

In the tripod stand of the invention, the upper portion of each leg is held by an upper holding member which is slidably adjustable along the main post. One end of a respective articulated arm is journaled to each leg between the ends of the leg and preferably generally at the middle part of the leg. The other end of the articulated arm is journaled to the main post below the upper holding member, generally at the lower end of the main post.

According to the invention, one of the three articulated arms is longer than the other two articulated arms between the journal connection to the main post and the journal connection to the respective leg. Further, the location along the respective leg of the stand at which the longer articulated arm is journaled is higher along that leg, that is closer to the upper holding member, than the location of the journaled connections of the other articulated arms to their respective legs. When the legs are folded inward toward the main post, the connections described do not affect the legs. When the legs are moved outward to the supporting position, the described connections and the articulated arm lengths makes the angle of separation between the one leg and the main post greater than the angle of separation from the main post for the other two legs.

With the legs in the supporting position, and without the one leg being tilted outwardly relative to the other legs, the bottom ends of the legs define an equilateral triangle on the ground. On the other hand, with the one leg tilted at a different angle than the other legs, the bottom ends of the legs define an isosceles triangle on the ground. This also tilts the main post toward the one leg which is further outward than the others and shifts the center of gravity of the stand toward the one leg and provides a more stable support for an instrument or device that is held on the stand spaced from the main post generally in the direction toward the one leg. The one leg connected to the longer articulated member extends outwardly further and braces the main post which has been tilted.

In another embodiment of the present invention, with the legs in the supporting position, the one leg is again tilted further outward from the main post than the other legs by the use of a respective longer articulated arm In the first embodiment, the angles between adjacent legs at the upper holding member around the main post are equal In the second embodiment, the angle around the main post between the two less outwardly tilted legs, which angle is opposite the more outwardly tilted leg, is greater than the angles between the more outwardly tilted leg and each of the two other less tilted legs The shifting of the two other legs toward the further outwardly tilted leg tends to make the triangle defined by the bottom ends of the legs more equilateral in shape than the triangle defined by the bottom ends of the legs in the first embodiment.

DESCRIPTION OF THE DRAWINGS

The foregoing and many other objects and features of the present invention will become apparent in the following description and drawings in which:

FIG. 3 is a side elevation of the stand with its legs folded for transport.

FIG. 4 is a top plan view of an alternate embodiment of a tripod stand of the invention, shown in solid lines, overlaid on the first embodiment, shown in broken lines.

DESCRIPTION OF THE PREFERRED EMBODIMENTS

Figure 1:
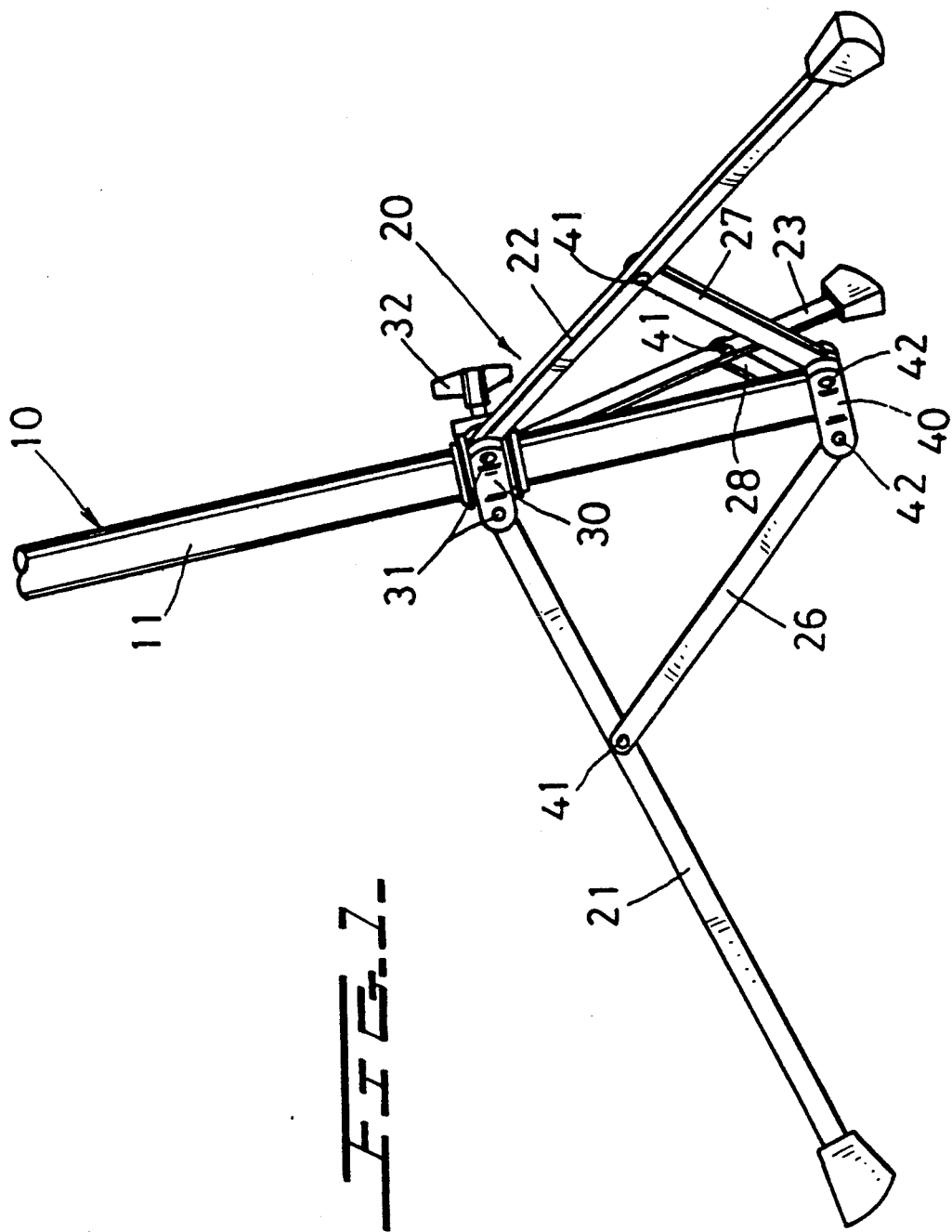
FIG. 1 is a view in perspective of a tripod stand with adjustable legs and embodying the present invention.

The tripod stand 10, for musical instruments or other objects, in FIG. 1, comprises a main post 11 and a three leg tripod part 20 located at the lower end of the main post 11. The main post 11 may be provided with any desired adjustable elongation or extension and any connection or holder for engaging a particular musical instrument or another device, such as a microphone.

The tripod section 20 includes the three legs 21, 22 and 23 and the articulated arms 26, 27 and 28 which are each hingedly connected or journaled at respective hinge pins 41 to the respective legs 21, 22 and 23 at a location along each leg intermediate its ends. The invention in part concerns the relative positions along those legs of the connections 41.

An upper, leg holding member 30 is slidable along the main post 11 and may be set at any desired position along the main post 11 by the set screw 32. The upper end of each leg 21, 22 and 23 is also hingedly, pivotally journaled at respective hinge pins 31 to the upper holding member 30.

A lower holding member 40 is placed on the main post, spaced below the upper holding member 30, and is preferably at the bottom end of the main post 11. The lower end of each articulated arm 26, 27 and 28 is hingedly, pivotally journaled on the lower holding member 40 by a respective hinge pin 42.

In this embodiment of the present invention, one of the articulated arms, here the arm 26, is longer than the other two arms 27, 28, which would tend to tilt the leg 21 outwardly from main post 11 further than the legs 22, 23 when the legs are in the outward supporting positions. Further contributing to the greater outward tilt of the leg 21 than the tilt of the legs 22 and 23, and as a supplement to the elongation of the leg 21, the one articulated arm 26 is connected to its leg 21 at a point higher on the main leg 21, that is, closer to the upper holding member 30, than are the connections of the other two articulated arms 27 and 28 to their respective legs 22 and 23.

Figure 2:
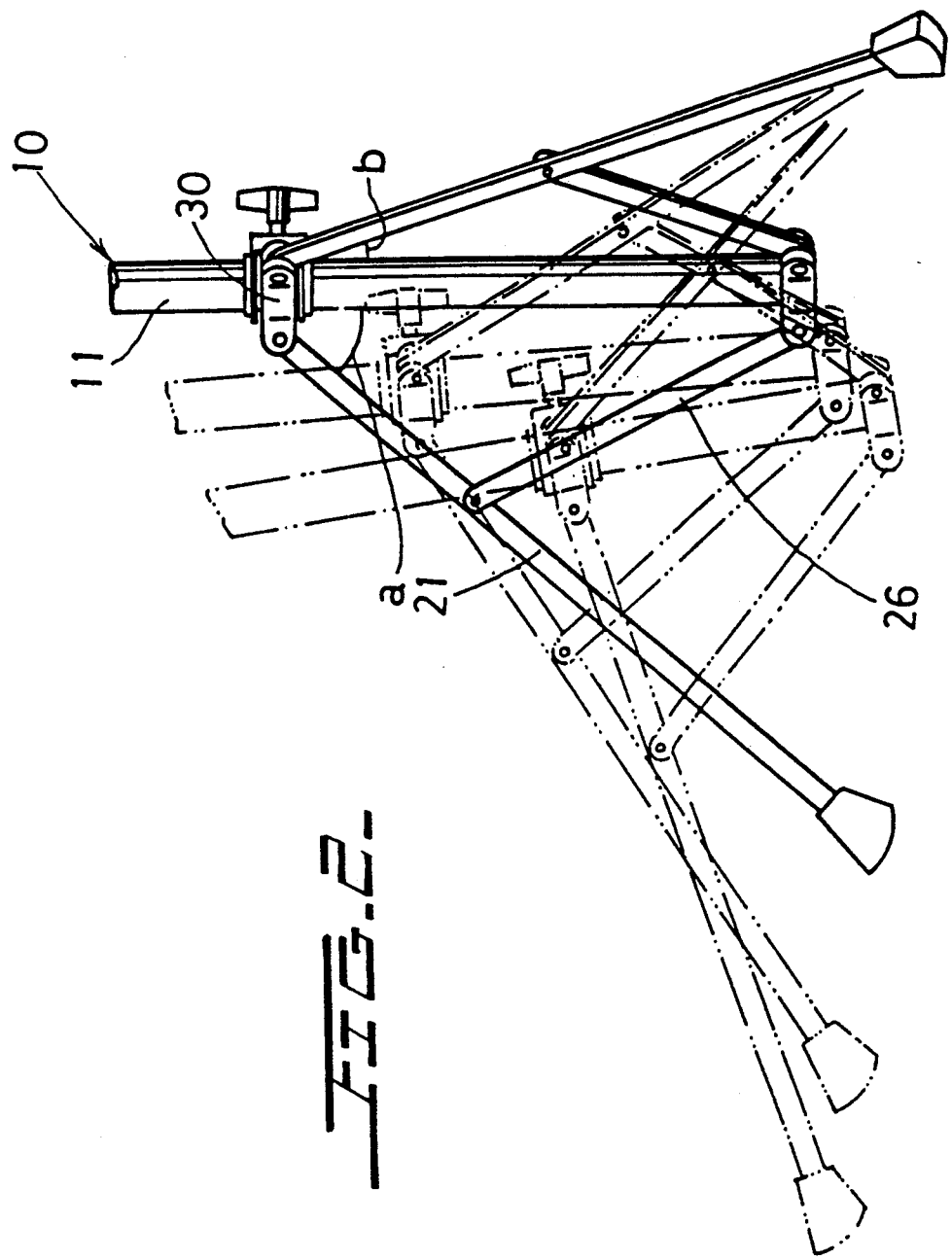
FIG. 2 is a view corresponding to FIG. 1 showing various tilted states of the main post of the stand and showing different outwardly tilted positions for the legs.

FIG. 2 illustrates a variety of the tilt arrangements for the stand 10 For the longer articulated arm 26, the open angle (a), measured from the main post 11, of the respective leg 21 is larger than the open angle (b), also measured from the main post, of the other two legs 22 and 23. The tilt angle of the main post 11 from vertical upright is determined by the magnitude of this angular difference. As the upper holding member 30 is slid downward, the difference between the open angles (a) and (b) of the legs gradually increases, as shown by the dotted lines, and the main post 11 tilts toward the leg 21 which has the longer articulated arm 26. Obviously, the upper holding member 30 can be slid upward beyond the position indicated in solid lines in FIG. 2, to bring the open angles (a) and (b) of all of the legs to be the same, thereby making it possible to hold the main post in a perpendicular upright, untilted position In FIG. 3, the longer articulated arm 26 is hingedly secured to its leg 21 at a point above the connection of the other articulated arms to their respective legs, that is, a point closer to the upper holding member. This enables the legs of the stand to be folded to the main post, with none of the legs sticking out.

FIG. 4 shows a modified embodiment in solid lines overlaid in the drawing on the first embodiment in broken lines. The broken lines show the top view of the three legged part 20 of the stand 10 shown in FIGS. 1, 2 and 3. The installation angle between each pair of the legs 21, 22 and 23 around the upper holding member 30, measured around the main post, is ordinarily fixed at the angle A of 120°, three equal angles around the main post 11. With the longer, differently attached articulated arm 26 attached on the leg 21, the main post 11 tilts toward the leg 21, while the angles A remain equal.

The three legged part 50 in the second, solid line embodiment of FIG. 4 includes the legs 51, 52 and 53 which are arranged at fixed preset installation angles around the main post 11 The installation angle $A_1$ around the upper holding member 54 between the legs 52 and 53, which legs do not have a long articulated arm, that is, do not have a long arm like 26, is made slightly larger than the two other installation angles between legs 51, 52 and legs 51, 53, so that angle $A_1$ is larger than 120°.

Because the legs 52 and 53 of stand part 50 have been moved toward leg 51, as compared with legs 22 and 23, the triangle formed at the bottom ends of the legs 51, 52, 53 defines nearly an equilateral triangle. The triangle formed by the bottom ends of the legs 21, 22, 23 when the main post 11 of the stand 10 is tilted, is an isosceles triangle wherein the two sides of the stand that extend generally along the tilting direction are longer than the side of the stand opposite the more tilted leg 21 Accordingly, the stand part 50 better resists any force that is applied from either side of the leg 51, which has the long articulated arm, as compared with a force applied from either side of leg 21 of part 20, thereby making it possible to obtain even greater stability with the second embodiment.

The structure of the present invention using the longer articulated arm 26 journaled further up the leg 21 makes it possible to hold an instrument or other device without requiring a special boom or part for the same. The center of gravity of the stand can be set, or by tilting the legs 21, 51 reset, at a position to improve the stability of the stand. When the main post 11 is tilted, it will still have adequate support. The invention may avoid need for a boom or an outrigger to support an instrument, device, etc., because the longer articulated arm 26 and its journal point high on its leg provide effectively the same result, without an increased number of parts, which achieves both economy and stability.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A tiltable tripod stand comprising:

a main post;

three tripod legs, the legs having respective upper ends; a holding member journaled to the upper ends of the legs and movable along the main post for moving the upper ends of the legs along the main post;

the legs having lower ends for resting on a surface on which the tripod stand is supported;

a respective articulated arm hingedly journaled to each leg intermediate the ends of the leg and also hingedly journaled to the main post, wherein movement of the upper ends of the legs with respect to the main post, through the articulated arms, selectively folds the legs together to close the stand and opens the legs apart to a supporting condition by forming the bottom ends of the legs into a triangle which supports the tripod stand;

one of the articulated arms being of a different length than the other two articulated arms; with the legs in the supporting condition, the length of the one articulated arm is selected to cause the tilt angle, with respect to the main post, of the leg connected to the one articulated arm to differ from the tilt angles with respect to the main post of the other two legs connected to the other two articulated arms, for causing the tilting of the main post from upright generally toward one of the legs;

wherein the articulated arms are each connected to the respective leg for that arm at distances spaced from the upper ends of the legs, and the distance of the connection of the one articulated arm from the upper end of the respective leg for that arm differs from the distance of the connection of the other articulated arms from the upper ends of the respective legs for that arm.

2. The tiltable tripod stand of claim 1, wherein the legs are of the same length.

3. A tiltable tripod stand comprising:

a main post;

three tripod legs, the legs having respective upper ends; a holding member journaled to the upper ends of the legs and movable along the main post for moving the upper ends of the legs along the main post;

the legs having lower ends for resting on a surface on which the tripod stand is supported;

a respective articulated arm hingedly journaled to each leg intermediate the ends of the leg and also hingedly journaled to the main post, wherein movement of the upper ends of the legs with respect to the main post, through the articulated arms, selectively folds the legs together to close the stand and opens the legs apart to a supporting position by forming the bottom ends of the legs into a triangle which supports the tripod stand;

one of the articulated arms being connected to one of the legs; the other two articulated arms each being connected to a respective one of the two other legs; the one articulated arm being longer than the other two articulated arms; with the legs in the supporting condition, the length of the one articulated arm is selected to cause the tilt angle, with respect to the main post, of the one leg connected to the one articulated arm to differ from the tilt angles, with respect to the main post, of the other two legs connected to the other two articulated arms, for causing the tilting of the main post from upright generally toward the one leg connected to the one articulated arm;

wherein each articulated arm is connected to the respective leg for that arm between the upper and the lower ends of the leg, and the distance of the connection of the one articulated arm from the upper end of the respective leg for that arm is shorter than the distance of the connections of the other articulated arms from the upper ends of the respective legs for those arms.

4. The tiltable tripod stand of claim 3, wherein the legs are of the same length.

5. The tiltable tripod stand of claim 4, wherein the legs are connected to the main post around the holding member at locations such that with one of the legs more tilted than the other legs, the bottom ends of the legs define an isosceles triangle, with the one leg being further out from the main post than the other two legs.

6. The tiltable tripod stand of claim 4, wherein around the main post and at the holding member, each of the legs is separated from the neighboring legs by an angle of separation, and the angle of separation at the holding member around the main post between every two legs is 120°.

7. The tiltable tripod stand of claim 4, wherein around the main post and at the holding member, each of the legs is separated from the neighboring legs by an angle of separation, and the angle of separation at the holding member around the main post between the two legs opposite the one leg is greater than the angle of separation between the one leg and each of the other two legs.

8. The tiltable tripod stand of claim 7, wherein the bottom ends of the legs define generally an equilateral triangle, variable slightly due to the selected angle of tilt of the main post.

9. The tiltable tripod stand of claim 3, wherein around the main post and at the holding member, each of the legs is separated from the neighboring legs by an angle of separation, and the angle of separation at the holding member around the main post between every two legs is 120°.

10. The tiltable tripod stand of claim 3, wherein around the main post and at the holding member, each of the legs is separated from the neighboring legs by an angle of separation, and the angle of separation at the holding member around the main post between two legs opposite the one leg is greater than the angle of separation between the one leg and each of the other two legs.

11. A tiltable tripod stand comprising:

a main post;

three tripod legs, the legs having respective upper ends; a holding member journaled to the upper ends of the legs at the main post for supporting the upper ends of the legs at the main post;

the legs having lower ends for resting on a surface on which the tripod stand is supported;

a respective articulated arm hingedly journaled to each leg intermediate the ends of the leg and also hingedly journaled to the main post, wherein movement of the articulated arms and the legs with respect to the main post, through the articulated arms, selectively folds the legs together to close the stand and opens the legs apart to a supporting condition by forming the bottom ends of the legs into a triangle which supports the tripod stand;

one of the articulated arms being connected to one of the legs; the other two articulated arms each being connected to a respective one of the two other legs; the one articulated arm being longer than the other two articulated arms; with the legs in the supporting condition, the length of the one articulated arm is selected to cause the tilt angle, with respect to the main post, of the one leg connected to the one articulated arm to differ from the tilt angles, with respect to the main post, of the other two legs connected to the other two articulated arms, for causing the tilting of the main post from upright generally toward the one leg connected to the one articulated arm;

wherein each articulated arm is connected to the respective leg for that arm between the upper and the lower ends of the leg, and the distance of the connection of the one articulated arm from the upper end of the respective leg for that arm is shorter than the distance of the connections of the other articulated arms from the upper ends of the respective legs for those arms.

12. The tiltable tripod stand of claim 11, wherein the legs are of the same length.

13. The tiltable tripod stand of claim 12, wherein the legs are connected to the main post around the holding member at locations such that with one of the legs more tilted than the other legs, the bottom ends of the legs define an isosceles triangle, with the one leg being further out from the main post than the other two legs.

14. The tiltable tripod stand of claim 12, wherein around the main post and at the holding member, each of the legs is separated from the neighboring legs by an angle of separation, and the angle of separation at the holding member around the main post between every two legs is 120°.

15. The tiltable tripod stand of claim 12, wherein around the main post and at the holding member, each of the legs is separated from the neighboring legs by an angle of separation, and the angle of separation at the holding member around the main post between the two legs opposite the one leg is greater than the angle of separation between the one leg and each of the other two legs.

16. A tiltable tripod stand comprising:

a main post;

first, second and third tripod legs, the legs having respective upper ends; a holding member journaled to the upper ends of the legs at the main post for supporting the upper ends of the legs along the main post;

the legs having lower ends for resting on a surface on which the tripod stand is supported;

first, second and third articulated arms each of which is hingedly journaled to the main post, the first arm being hingedly journaled to the first leg intermediate the ends of the first leg, the second arm being hingedly journaled to the second leg intermediate the ends of the second leg, the third arm being hingedly journaled to the third leg intermediate the ends of the third leg, wherein movement of the articulated arms and the legs with respect to the main post, through the articulated arms, selectively folds the legs together to close the stand and opens the legs apart to a supporting condition by forming the lower ends of the legs into a triangle which supports the tripod stand;

cooperating means on the first articulated arm and on the first leg for enabling the angle between the main post and the first leg to differ from the angle between the main post and the second leg and the angle between the main post and the third leg, for causing the tilting of the main post from upright generally toward the first leg;

around the main post and at the holding member, each of the three legs is separated from neighboring legs by an angle of separation, and the angle of separation at the holding member around the main post between the second and third legs is greater than the angle of separation between the first leg and and the second leg and the angle of separation between the first leg and the third leg.

17. The tiltable tripod stand of claim 16, wherein the lower ends of the legs define generally an equilateral triangle.

* * * * *